(No Model.)
A. P. MILLSPAUGH.
BENCH HOOK.
No. 376,331. Patented Jan. 10, 1888.
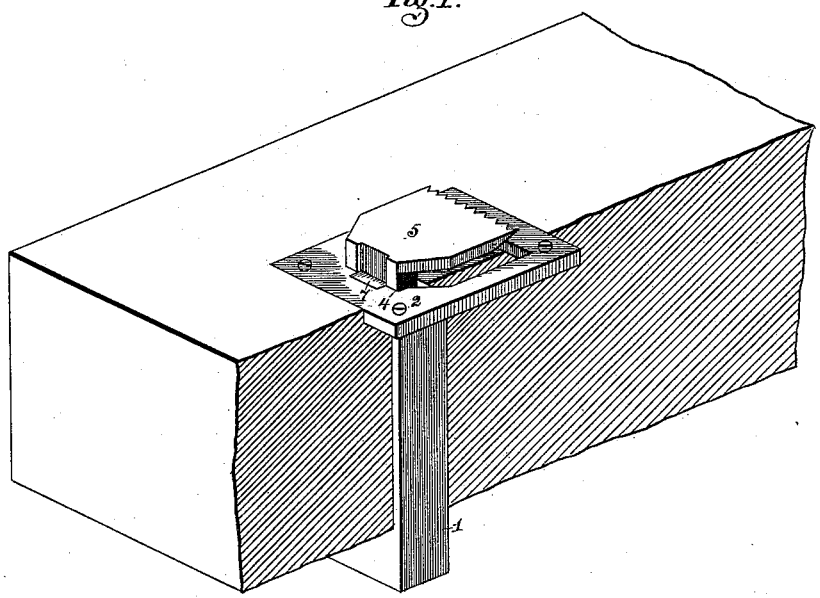
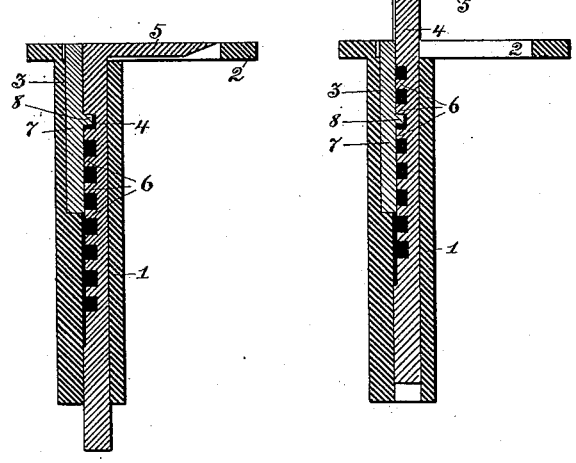
Witnesses,
S. J. Williamson
Inventor,
Andreas P. Millspaugh
by Smith and Hubbard
attys.

UNITED STATES PATENT OFFICE.

ANDREAS P. MILLSPAUGH, OF DARIEN, CONNECTICUT.

BENCH-HOOK.

SPECIFICATION forming part of Letters Patent No. 376,331, dated January 10, 1888.

Application filed August 23, 1887. Serial No. 247,683. (No model.)

*To all whom it may concern:*

Be it known that I, ANDREAS P. MILLSPAUGH, a citizen of the United States, residing at Darien, in the county of Fairfield and State of Connecticut, have invented certain new and useful Improvements in Bench-Hooks; and I do hereby declare the following to be a full, clear, and exact description of the invention, such as will enable others skilled in the art to which it appertains to make and use the same.

My invention relates to certain new and useful improvements in bench-hooks for carpenters' and joiners' use, and has for its object to provide a device of this description which shall be cheap and simple in its construction, which shall be capable of quick and easy adjustment for the accommodation of boards of varying thickness, and which, when placed in position, shall be incapable of accidental change therefrom; and with these ends in view, my invention consists in the details of construction hereinafter set forth, and then recited in the claims.

In order that such as are skilled in the art to which my invention appertains may understand how to make and use my improvement, I will describe the same in detail, reference being had to the accompanying drawings, forming a part of this specification, and in which—

Figure 1 is a perspective view of my device in position; Fig. 2, a central vertical section thereof with the hook down, and Fig. 3 a similar view with the hook raised.

Like parts are denoted by like figures of reference in all the views.

1 is a hollow box or casing open at both ends and preferably cast out of iron.

2 is a bench-plate secured to or cast integral with the casing and adapted to be let into the surface of the bench, so as to lie flush therewith, as shown at Fig. 1.

Formed in one of the inner walls of the casing is a recess, 3, which is shown as of substantially rectangular shape, but which might be otherwise conformed.

4 is the hook-shank, which is made to slide readily in the casing, and 5 the hook-blade secured to the top of said shank. Upon the side designed to be next the recess within the casing the hook-shank is racked, as shown at 6.

7 is a key adapted in form to the recess 3, and having formed thereon one or more teeth, 8, arranged to fit the teeth of the rack upon the hook-shank.

In using my improvement the casting is tightly mortised into the bench and the bench-plate let into the surface of the latter.

In arranging the hook for the support of work the key is laid against the hook-shank, with its tooth or teeth engaging with the teeth of the rack. The shank and key thus laid together are then dropped into the casing. As soon as the end of the key strikes the bottom wall of the recess, it can of course go no farther, and the shank is held as against further downward movement by the engagement of the key-teeth with the racked surface. By engaging the key with rack nearer to or farther from the top of the shank the hook will, as will be readily understood, project less or more above the surface of the bench, and be thereby adapted to accommodate thinner or thicker stock.

I have shown the shank as racked on its side and the casing recessed at its rear wall; but I do not wish to be understood as limiting myself to the use of these adjacent surfaces, since my device can be arranged upon any of the four sides of the shank and casing, or, if it should be found to be more advantageous, upon two sides. The recess and key, moreover, may be of any desired shape and conformation.

Having thus described my invention, I claim—

1. In a device of the character described, the combination, with the hook and the racked shank thereto attached, of the hollow casing recessed as to one of its side walls, said recess being open at the top and adapted to receive the key by insertion of the latter from above, and the toothed key adapted to mesh with the racked surface of the shank and to abut against the end wall of the said recess, whereby the shank and hook are secured in position, substantially as set forth.

2. In a bench-hook, the hollow casing having the bench-plate thereto secured, said casing formed with a substantially rectangular recess in one of its sides, said recess extending to the top of the casing and provided with a lower end abutment-wall, in combination with the hook-blade, the racked shank upon which said blade is supported, and the toothed key substantially conformed to the shape of the recess and adapted both to mesh with the racked surface of the shank and to abut against the said end wall of the recess, whereby the shank is locked to the casing as against any downward movement, substantially as shown and described.

In testimony whereof I affix my signature in presence of two witnesses.

ANDREAS P. MILLSPAUGH.

Witnesses:
S. H. HUBBARD,
S. S. WILLIAMSON.